US010232448B2

(12) United States Patent
Zheng et al.

(10) Patent No.: US 10,232,448 B2
(45) Date of Patent: Mar. 19, 2019

(54) CHAMFER REMOVING DEVICE FOR WHEELS

(71) Applicant: CITIC Dicastal CO.,LTD, Qinhuangdao (CN)

(72) Inventors: Yao Zheng, Qinhuangdao (CN); Jiandong Guo, Qinhuangdao (CN); Lei Yang, Qinhuangdao (CN); Xiaoguang Huang, Qinhuangdao (CN); Zhifeng Zhang, Qinhuangdao (CN); Huiying Liu, Qinhuangdao (CN); Zhiyuan Yu, Qinhuangdao (CN); Weimin Cai, Qinhuangdao (CN); Yongwang Zhao, Qinhuangdao (CN)

(73) Assignee: CITIC Dicastal Co., LTD (CN)

( * ) Notice: Subject to any disclaimer, the term of this patent is extended or adjusted under 35 U.S.C. 154(b) by 0 days.

(21) Appl. No.: 15/692,698

(22) Filed: Aug. 31, 2017

(65) Prior Publication Data
US 2018/0333783 A1 Nov. 22, 2018

(30) Foreign Application Priority Data

May 17, 2017 (CN) .......................... 2017 1 03478004

(51) Int. Cl.
| | |
|---|---|
| *B23B 39/16* | (2006.01) |
| *B23B 39/20* | (2006.01) |
| *B23Q 3/06* | (2006.01) |
| *B23Q 5/033* | (2006.01) |

(52) U.S. Cl.
CPC .......... *B23B 39/161* (2013.01); *B23B 39/162* (2013.01); *B23B 39/20* (2013.01); *B23Q 3/062* (2013.01); *B23Q 5/033* (2013.01)

(58) Field of Classification Search
CPC ....... B23B 5/16; B23B 39/161; B23B 39/162; B23B 39/20; B23Q 5/033
See application file for complete search history.

(56) References Cited

U.S. PATENT DOCUMENTS

| | | | | |
|---|---|---|---|---|
| 3,203,282 | A | * | 8/1965 | Wilson .................. B23B 39/161 408/46 |
| 9,682,428 | B2 | * | 6/2017 | Stricklen ............... B23B 39/161 |

FOREIGN PATENT DOCUMENTS

| | | | | |
|---|---|---|---|---|
| CA | 2701319 A1 | * | 10/2010 | ........... B23B 39/161 |
| CN | 104439374 A | * | 3/2015 | |

* cited by examiner

*Primary Examiner* — Alan Snyder
(74) *Attorney, Agent, or Firm* — Calfee, Halter & Griswold LLP

(57) ABSTRACT

The present application provides a chamfer removing device for wheels. The device may be used for removing a bolt hole chamfer on flange side of back cavity of a wheel in hub machining process. Drill bits are spaced a certain height from the flange side of the wheel by adjusting the relative height of an external thread guiding sleeve in an internal thread guiding sleeve, a motor and gears drive the drill bits to rotate, and a cylinder and a sliding box drive the drill bits to move up and down so as to realize chamfer removing function.

3 Claims, 3 Drawing Sheets

CHAMFER REMOVING DEVICE FOR WHEELS

CROSS-REFERENCE TO RELATED APPLICATIONS

This application claims priority to Chinese Patent Application No. 201710347800.4 filed on May 17, 2017, which is hereby incorporated by reference in its entirety.

TECHNICAL FIELD

The present application relates to a metal cutting device, and specifically to a wheel surface treatment device.

BACKGROUND ART

A bolt hole chamfer on the side of a wheel flange can ensure successful assembly of a wheel. However, the chamfer is machined for relatively long time in a single hole machining manner at present, so that the efficiency of a machining center for machining wheels is relatively low; and particularly for the improvement on the efficiency of a lathe in the previous procedure, the single hole chamfer removing method cannot meet the requirements of automatic production nowadays.

SUMMARY OF THE INVENTION

The present application is aimed at providing a chamfer removing device for wheels.

To fulfill the above aim, the present application adopts the following technical solution: a chamfer removing device for wheels includes a lower base, an upper base, a cylinder bottom plate, a guide table cylinder, a connecting plate, a deceleration motor, a supporting plate, a tray, an external thread guiding sleeve, a sliding box, sliding keys, bearings, cylinders, shafts, glands, stop blocks, gears, keys, sleeves, rubber dust rings, an organ-type threaded dust cover, a sliding box cover, shoulder rings, sealing felt rings, end covers, drill bits, core shafts, a center shaft end cover, a center shaft, nonstandard connecting screws, an O-shaped ring, a center shaft lower end cover, inner positioning rings, gaskets, blow pipes, pressure blocks and an internal thread guiding sleeve.

The lower base is fixed on the ground, the upper base and the cylinder bottom plate are fixed on the lower base, the guide table cylinder is fixed on the cylinder bottom plate, and the guide table cylinder is fixed together with the deceleration motor via the connecting plate. The upper end of the deceleration motor is connected with the supporting plate, and the supporting plate, the sliding box and the sliding box cover are fixed together. The external thread guiding sleeve is fixed on the upper base, the tray is fixed below the external thread guiding sleeve to support the sliding box, the sliding keys are fixed on the external thread guiding sleeve, and the sliding box slides circumferentially in the external thread guiding sleeve via the sliding keys; each shaft is rotatably fixed in the sliding box and the sliding box cover by using two bearings, the bearing at the upper end is fixed on the shaft by using the shoulder ring, each of the gears is axially fixed on the shaft via shoulder and the sleeve and circumferentially fixed via the key, the drill bit is fixed at the extension end of the shaft, the extension end of the shaft is fixed on the sliding box cover via the end cover and sealed with the sealing felt ring, the internal thread guiding sleeve is in threaded connection with the external thread guiding sleeve, the stop block is put into the side wall of the external thread guiding sleeve, and the stop block is tightened with the internal thread guiding sleeve via a screw on the gland. The rubber dust ring is put into the upper end of the external thread guiding sleeve to prevent foreign matters from entering the sliding box, and the organ-type threaded dust cover covers the upper end of the external thread guiding sleeve to protect threads. The center shaft penetrates through the output end of the deceleration motor, is respectively fixed on the sliding box and the sliding box cover via the center shaft lower end cover and the center shaft end cover, and rotates via the bearings. Each of the gears is fixed on the shaft via the shoulder and the sleeve, wherein the center shaft lower end cover is sealed with the O-shaped ring. The center shaft end cover is connected with the core shafts together to play a role in circumferentially positioning a wheel. The gasket is fixed on the internal thread guiding sleeve, the inner positioning ring is fixed on the gasket, the cylinder is fixed on the internal thread guiding sleeve, and the pressure block is in threaded connection with an extension rod of the cylinder. When the wheel is put on the internal thread guiding sleeve by a manipulator, the height of the internal thread guiding sleeve relative to the external thread guiding sleeve is adjusted, so that the flange surface of the wheel is spaced a certain height from the upper surface of the sliding box cover, i.e., the drill bits are spaced a certain height from the flange surface of the wheel, wherein the certain height is a limit stroke of the guide table cylinder, and the final chamfer removing position is just completed after the guide table cylinder reaches the limit stroke.

After the wheel having the height adjusted is put on the internal thread guiding sleeve, air is introduced into the cylinders, the pressure blocks in threaded connection with cylinder rods motion linearly to compact the wheel lip, thereby realizing wheel compaction.

The center shaft is connected with the output end of the deceleration motor via the key, the center shaft is driven to rotate via the bearing, each of the gears is fixed on the center shaft by using the shoulder and the key and rotates along with the center shaft, the gear on the center shaft and the gears on the pitch circle are same in size and have the drive ratio of 1:1, the five gears on the pitch circle engage with the gear on the center shaft and drive the five shafts fixed on the gears on the pitch circle to rotate, and the rotating function of the drill bits is finally realized.

After the height of the wheel is adjusted and the wheel is compacted, air is introduced into the guide table cylinder, an output rod of the guide table cylinder pushes the connecting plate, the deceleration motor, the supporting plate and the sliding box to move up in the axial direction and simultaneously drives the drill bits to implement an upward cutting action, and a bolt hole chamfer on the flange side of the wheel is finally removed.

The chamfer removing device for wheels in the present application may adapt to wheels having different sizes, different heights and different bolt hole pitch circles in use, is simple and convenient to use, stable and reliable, may realize automatic chamfer removal of wheels, and greatly improves the wheel machining efficiency.

Figure 1:
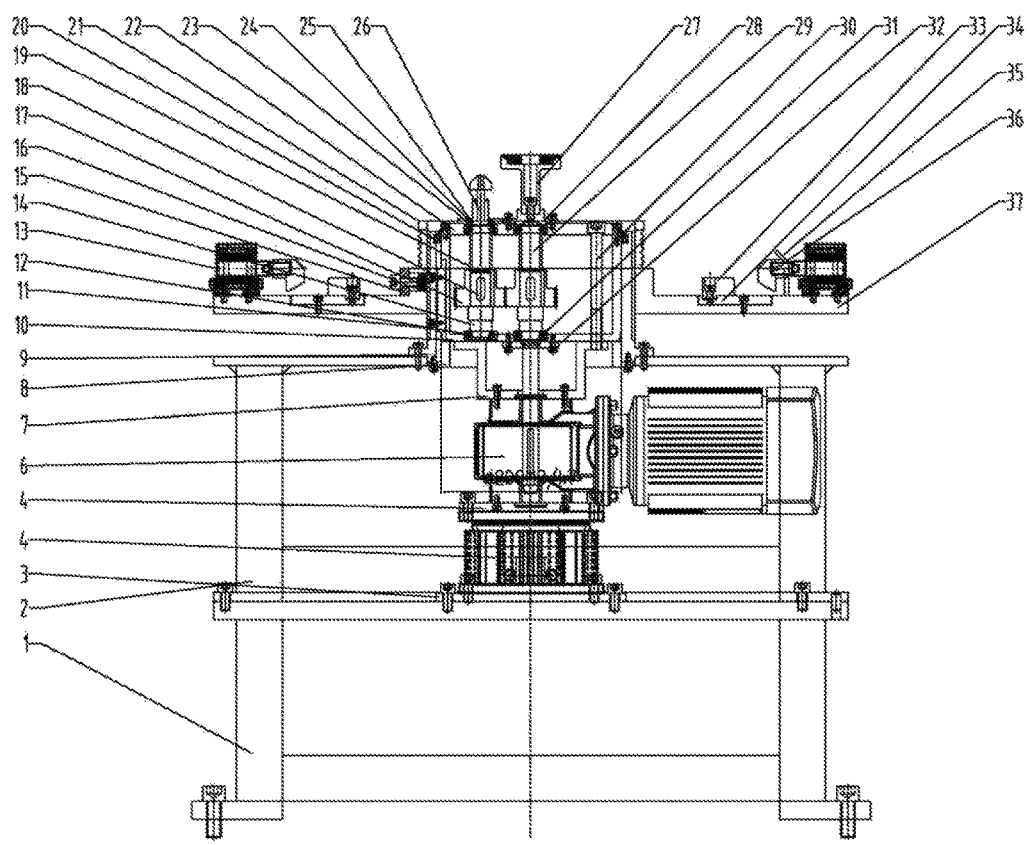
FIG. 1 is a structural schematic diagram of a chamfer removing device for wheels in the present application.
Figure 2:
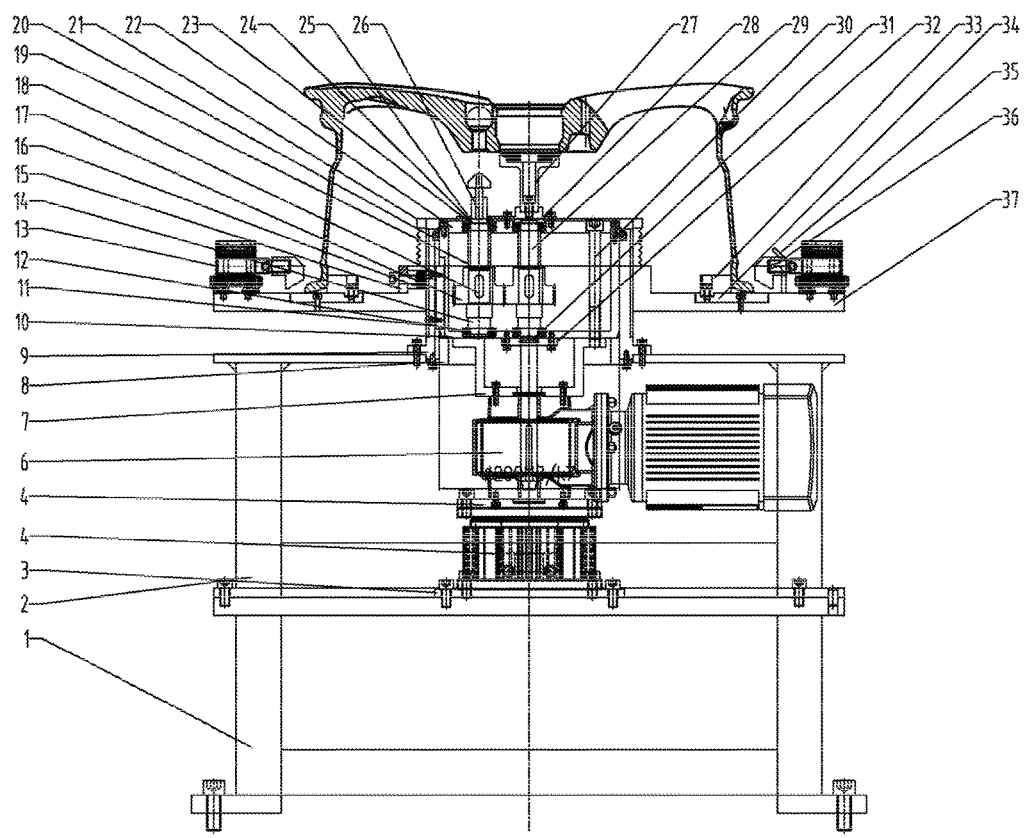
FIG. 2 is a schematic diagram of a working state of the chamfer removing device for wheels in the present application.
Figure 3:
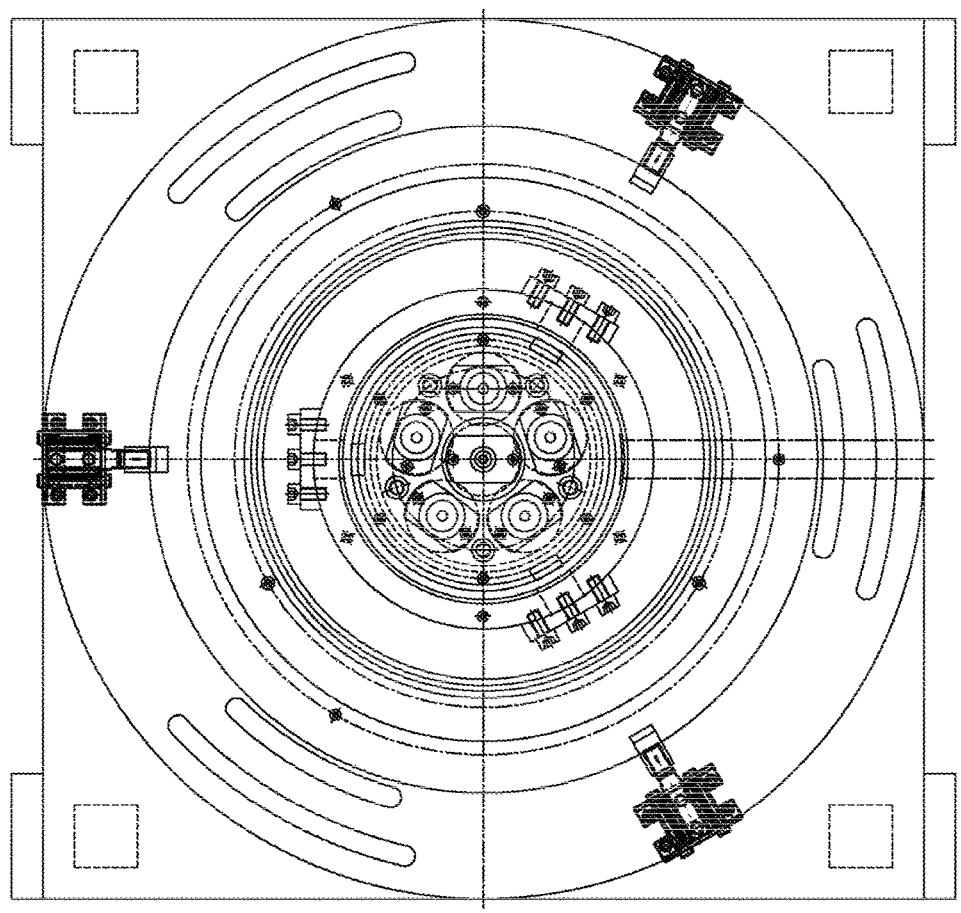
FIG. 3 is a top view of the chamfer removing device for wheels in the present application.

In figures: 1—lower base, 2—upper base, 3—cylinder bottom plate, 4—guide table cylinder, 5—connecting plate, 6—deceleration motor, 7—supporting plate, 8—tray, 9—external thread guiding sleeve, 10—sliding box, 11—sliding key, 12—bearing, 13—cylinder, 14—shaft, 15—gland, 16—stop block, 17—gear, 18—key, 19—sleeve, 20—rubber dust ring, 21—organ-type threaded dust cover, 22—sliding box cover, 23—shoulder ring, 24—sealing felt ring, 25—end cover, 26—drill bit, 27—core shaft, 28—center shaft end cover, 29—center shaft, 30—nonstandard connecting screw, 31—O-shaped ring, 32—center shaft lower end cover, 33—inner positioning ring, 34—gasket, 35—blow pipe, 36—pressure block, 37—internal thread guiding sleeve.

DETAILED DESCRIPTION OF THE INVENTION

The details and working conditions of the specific device provided by the present application will be specified below in combination with the accompanying drawings.

A chamfer removing device for wheels includes a lower base 1, an upper base 2, a cylinder bottom plate 3, a guide table cylinder 4, a connecting plate 5, a deceleration motor 6, a supporting plate 7, a tray 8, an external thread guiding sleeve 9, a sliding box 10, sliding keys 11, bearings 12, cylinders 13, shafts 14, glands 15, stop blocks 16, gears 17, keys 18, sleeves 19, rubber dust rings 20, an organ-type threaded dust cover 21, a sliding box cover 22, shoulder rings 23, sealing felt rings 24, end covers 25, drill bits 26, core shafts 27, a center shaft end cover 28, a center shaft 29, nonstandard connecting screws 30, an O-shaped ring 31, a center shaft lower end cover 32, inner positioning rings 33, gaskets 34, blow pipes 35, pressure blocks 36 and an internal thread guiding sleeve 37. The lower base 1 is fixed on the ground via foundation bolts, the upper base 2 and the cylinder bottom plate 3 are respectively fixed on the lower base 1 via bolts and cylindrical pins, the guide table cylinder 4 is fixed on the cylinder bottom plate 3 by using bolts, the guide table cylinder 4 is fixed together with the deceleration motor 6 via the connecting plate 5, the upper end of the deceleration motor 6 is connected with the supporting plate 7 via bolts, and the supporting plate 7, the sliding box 10 and the sliding box cover 22 are fixed together via the nonstandard connecting screws 30; the external thread guiding sleeve 9 is fixed on the upper base 2 via bolts, the tray 8 is fixed below the external thread guiding sleeve 9 via screws to support the sliding box 10, the sliding keys 11 are fixed on the external thread guiding sleeve 9 by using a screws, and the sliding box 10 slides circumferentially in the external thread guiding sleeve 9 via the sliding keys 11; each shaft 14 is rotatably fixed in the sliding box 10 and the sliding box cover 22 by using two bearings 12, the bearing 12 at the upper end is fixed on the shaft 14 by using the shoulder ring 23, each of the gears 17 is axially fixed on the shaft 14 via shoulder and the sleeve 19 and circumferentially fixed via the key 18, the drill bit 26 is fixed at the extension end of the shaft 14, the extension end of the shaft 14 is fixed on the sliding box cover 22 via the end cover 25 and sealed with the sealing felt ring 24, the internal thread guiding sleeve 37 is in threaded connection with the external thread guiding sleeve 9, the stop block 16 is put into the side wall of the external thread guiding sleeve 9, the stop block 16 is tightened with the internal thread guiding sleeve 37 via a screw on the gland 15, the rubber dust ring 20 is put into the upper end of the external thread guiding sleeve 9 to prevent foreign matters from entering the sliding box 10, the organ-type threaded dust cover 21 covers the upper end of the external thread guiding sleeve 9 to protect threads, the center shaft 29 penetrates through the output end of the deceleration motor 6, is respectively fixed on the sliding box 10 and the sliding box cover 22 via the center shaft lower end cover 32 and the center shaft end cover 28 and rotates via the bearings 12, each of the gears 17 is fixed on the shaft via the shoulder and the sleeve 19, wherein the center shaft lower end cover 32 is sealed with the O-shaped ring 31, the center shaft end cover 28 is connected with the core shafts 27 together via screws to play a role in circumferentially positioning a wheel, the gasket 34 is fixed on the internal thread guiding sleeve 37 by using screws, the inner positioning ring 33 is fixed on the gasket 34, the cylinders 13 are fixed on the internal thread guiding sleeve 37, and the pressure block 36 is in threaded connection with an extension rod of the cylinder 13.

When the wheel is put on the internal thread guiding sleeve 37 by a manipulator, and the height of the internal thread guiding sleeve 37 relative to the external thread guiding sleeve 9 is adjusted, the flange surface of the wheel is spaced a certain height from the upper surface of the sliding box cover 22, i.e., the drill bits 26 are spaced a certain height from the flange surface of the wheel, wherein the certain height is a limit stroke of the guide table cylinder 4, and the final chamfer removing position is just completed after the guide table cylinder 4 reaches the limit stroke.

After the wheel having the height adjusted is put on the internal thread guiding sleeve 37, air is introduced into the cylinders 13, the pressure blocks 36 in threaded connection with cylinder rods motion linearly to compact the wheel lip, thereby realizing wheel compaction.

The center shaft 29 is connected with the output end of the deceleration motor 6 via the key, the center shaft 29 is driven to rotate via the bearing 12, each of the gears 17 is fixed on the center shaft 29 by using the shoulder and the key 18 and rotates along with the center shaft 29, the gear 17 on the center shaft 29 and the gears 17 on the pitch circle are the same in size and have a drive ratio of 1:1, the gear 17 on the center shaft 29 and the five gears 17 on the pitch circle are engaged and drive the five shafts 14 fixed on the gears 17 on the pitch circle to rotate, and the rotating function of the drill bits 26 is finally realized.

After the height of the wheel is adjusted and the wheel is compacted, air is introduced into the guide table cylinder 4, an output rod of the guide table cylinder 4 pushes the connecting plate 5, the deceleration motor 6, the supporting plate 7 and the sliding box 10 to move up in the axial direction and simultaneously drives the drill bits 26 to implement an upward cutting action, and a bolt hole chamfer on the flange side of the wheel is finally removed.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A chamfer removing device for wheels comprising a lower base, an upper base, a cylinder bottom plate, a guide table cylinder, a connecting plate, a deceleration motor, a supporting plate, a tray, an external thread guiding sleeve, a sliding box, sliding keys, bearings, cylinders, shafts, glands, stop blocks, gears, keys, sleeves, rubber dust rings, an organ-type threaded dust cover, a sliding box cover, shoulder rings, sealing felt rings, end covers, drill bits, core shafts, a center shaft end cover, a center shaft, nonstandard connecting screws, an O-shaped ring, a center shaft lower end cover, inner positioning rings, gaskets, blow pipes, pressure blocks and an internal thread guiding sleeve, wherein the lower base is fixed on the ground, the upper base and the cylinder bottom plate are fixed on the lower base, the guide table cylinder is fixed on the cylinder bottom plate, the guide table cylinder is fixed together with the deceleration motor via the connecting plate, the upper end of the deceleration motor is connected with the supporting plate, and the supporting plate, the sliding box and the sliding box cover are fixed together via the nonstandard connecting screws; the external thread guiding sleeve is fixed on the upper base, the tray is fixed below the external thread guiding sleeve to support the sliding box, the sliding keys are fixed on the external thread guiding sleeve, and the sliding box slides circumferentially in the external thread guiding sleeve via the sliding keys; each of the shafts is fixed in the sliding box and the sliding box cover by using two bearings, each of the bearings at the upper end is fixed on one of the shafts by using one of the shoulder rings, each of the gears is axially fixed on one of the shafts via one of shoulders and one of the sleeves and circumferentially fixed via one of the keys, each of the drill bits is fixed at the extension end of one of the shafts, the extension end of each of the shafts is fixed on the sliding box cover via one of the end covers and sealed with one of the sealing felt rings, the internal thread guiding sleeve is in threaded connection with the external thread guiding sleeve, the stop block is put into the side wall of the external thread guiding sleeve, each of the stop blocks is tightened with the internal thread guiding sleeve via a screw on the gland, each of the rubber dust rings is put into the upper end of the external thread guiding sleeve to prevent foreign matters from entering the sliding box, the organ-type threaded dust cover covers the upper end of the external thread guiding sleeve to protect threads, the center shaft penetrates through the output end of the deceleration motor, is respectively fixed on the sliding box and the sliding box cover via the center shaft lower end cover and the center shaft end cover and rotates via the bearings, each of the gears is fixed on one of the shafts via one of the shoulders and one of the sleeves, the center shaft lower end cover is sealed with the O-shaped ring, the center shaft end cover is connected with the core shafts together via screws to play a role in circumferentially positioning a wheel, one of the gaskets is fixed on the internal thread guiding sleeve, one of the inner positioning rings is fixed on one of the gaskets, the cylinders are fixed on the internal thread guiding sleeve, and each of the pressure blocks is in threaded connection with an extension rod of one of the cylinders.

2. The chamfer removing device for wheels according to claim 1, wherein the center shaft is connected with an output end of the deceleration motor via a key, the center shaft is driven to rotate via the bearing, the gears are fixed on the center shaft by using the shoulders and the keys and rotates along with the center shaft, the gears on the center shaft and gears on the pitch circle are the same in size and have a drive ratio of 1:1, the gears on the center shaft and the gears on the pitch circle are engaged and drive the shafts fixed by the gears to rotate, and rotating function of the drill bits is finally realized.

3. The chamfer removing device for wheels according to claim 2, wherein after the height of the wheel is adjusted and the wheel is compacted by the pressure blocks, air is introduced into the guide table cylinder, and an output rod of the guide table cylinder pushes the connecting plate, the deceleration motor, the supporting plate and the sliding box to move up in axial direction and simultaneously drives the drill bits to implement an upward cutting action.

* * * * *